United States Patent [19]
Lee et al.

[11] Patent Number: 5,842,580
[45] Date of Patent: Dec. 1, 1998

[54] METHOD OF PRODUCING SOCKET PLATE FOR WOBBLE PLATE COMPRESSORS

[75] Inventors: Han Jung Lee; Han Hung Lee, both of Seoul, Rep. of Korea

[73] Assignee: Sung Young Metal Works Co., Ltd., Rep. of Korea

[21] Appl. No.: 845,213

[22] Filed: Apr. 21, 1997

[51] Int. Cl.⁶ .................................................. B23P 15/00
[52] U.S. Cl. ................................ 29/888.025; 29/888.02; 29/515
[58] Field of Search ....................... 29/888.044, 888.047, 29/888.02, 888.025, 505, 515; 72/256

[56] References Cited

U.S. PATENT DOCUMENTS

| | | | |
|---|---|---|---|
| Re. 32,008 | 10/1985 | Wagner et al. | 72/256 |
| 4,138,775 | 2/1979 | Takaoka et al. | 29/888.02 |
| 4,270,255 | 6/1981 | Klimek | 29/888.044 |
| 4,548,254 | 10/1985 | Roberts | 29/888.047 |
| 4,550,645 | 11/1985 | Beck, Jr. | 29/888.02 |
| 4,860,567 | 8/1989 | Askey et al. | 72/256 |
| 5,655,432 | 8/1997 | Wilkosz et al. | 29/888.02 |

*Primary Examiner*—I. Cuda
*Attorney, Agent, or Firm*—Longacre & White

[57] ABSTRACT

In a method of producing a socket plate for wobble plate compressors an insert ring and a holed socket plate parent metal, having different mechanical and physical properties, are formed through extrusion processes prior to hot-forging the parent metal with the ring into a resulting socket plate. In the hot-forging step, the insert ring is seated onto the ring seat of a bottom mold prior to fitting the parent metal over the ring. Thereafter, a top mold is lowered onto the bottom mold, thus forming the resulting socket plate. A plurality of lubrication grooves are formed on the internal surface of the ring during the hot-forging step, with a plurality of projections being formed on the external surface of the ring. The projections bite into the inside wall of the holed parent metal thus integrating the ring with the parent metal into a single body.

3 Claims, 6 Drawing Sheets

METHOD OF PRODUCING SOCKET PLATE FOR WOBBLE PLATE COMPRESSORS

BACKGROUND OF THE INVENTION

1. Field of the Invention

The present invention relates, in general, to a method of producing a socket plate for wobble plate compressors and, more particularly, to a method of producing such a socket plate by inserting a machined insert ring into an extrusion-processed plate prior to hot-forging them into a socket plate.

2. Description of the Prior Art

As well known to those skilled in the art, typical car air conditioners individually comprise a compressor, a condenser, an expansion valve and an evaporator in a manner similar to typical room air conditioners.

In such a car air conditioner, the compressor repeatedly carries out an operation for compressing the refrigerant gas in a cooling cycle and feeding the compressed gas to the condenser. During such a cooling cycle, the refrigerant gas is continuously circulated in the air conditioner thus reducing the temperature inside a car, with room heat being absorbed by the evaporator and passing through the compressor and in turn dissipating into the air flowing around the condenser.

Such compressors are generally classified into three types: wobble plate compressors, swash plate compressors and rotary compressors of movable vane.

This invention relates, particularly, to a method of producing a socket plate for such wobble plate compressors so that only the wobble plate compressors are shown in the following description.

FIG. 3 is a schematic sectional view of a wobble plate compressor, which has a typical socket plate and is installed in a car air conditioner. As shown in the drawing, a compressor 100 comprises two cylinders 101, two pistons (plungers) 102, two connecting rods 103, one socket plate (piston-carrying body) 104 and one rotating shaft (drive shaft) 105.

The socket plate 104 is mounted to the rotating shaft 105 with a predetermined angle of inclination being formed between them. Meanwhile, the connecting rods 103 are connected to respective positions of the socket plate 104 and are movable to the front, back, left, right and circumferentially. The pistons 102, which are connected to the rods 103, are fitted into the cylinders 101, respectively.

In the operation of the compressor, the socket plate 104 is rotated in conjunction with the rotating shaft 105. Therefore, the connecting rods 103 of the socket plate 104 are moved upward or downward at the angle of inclination of the socket plate 104 relative to the rotating shaft 105, thus rectilinearly reciprocating the pistons 102 inside the cylinders 101.

The pistons 102, which are operated in conjunction with the socket plate 104, thus compress the refrigerant gas inside the cylinders 101 so that the pistons 102 pressurize the refrigerant gas inside the cylinders 101 while sucking low pressure refrigerant gas into the cylinders 101. Therefore, the refrigerant gas is continuously circulated in the air conditioner during a cooling cycle.

In such a socket plate 104, an insert ring is fitted into the shaft hole of the plate 104 thus allowing the plate 104 to smoothly rotate with the rotating shaft 105.

In the prior art, such a socket plate with an insert ring is produced as follows. That is, a melted aluminum alloy is primarily cast into a solid body prior to annealing and heating the body. After the annealing and heating processes, the solid body is formed into a socket plate parent metal through an extrusion process. The socket plate parent metal in turn is reformed into a desirable configuration prior to cutting the parent metal into a predetermined size, thus making the parent metal suitable for a continued forging process.

Thereafter, the socket plate parent metal is seated into a forging mold set prior to pressurizing and machining the parent metal in the mold set. The parent metal is thus forged into a socket plate configuration. The parent metal having the socket plate configuration in turn is machined into a socket plate.

In addition, an insert ring, which is to be interferentially fitted into a hole of the socket plate, is produced by machining an insert ring parent metal, with the external surface of the insert ring being knurled in order to prevent the ring from being unexpectedly removed from the socket plate.

Thereafter, the insert ring with the knurled external surface is fitted into the hole of the socket plate through an interference fitting process, thus finishing the process of producing a socket plate with an insert ring.

The above method of producing the socket plate is profitable in that it effectively produces a strong socket plate. However, the method comprises several steps so that it is problematic in that it wastes labor, takes too long, requires expensive manufacturing equipment, wastes energy, increases the cost of the socket plate and reduces work efficiency.

Another problem of the above method is caused by different physical properties of metals, which are formed into the insert ring and socket plate respectively. That is, the insert ring may be loosened inside the hole of the socket plate and be unexpectedly removed from the socket plate due to the different physical properties of the two metals.

In an effort to overcome the problems caused by the above method, Korean Patent Appln. No. 95-39893 by this applicant discloses another method of producing a socket plate for wobble plate compressors. The above Korean method comprises the 1st step of seating an internal bearing inside a socket plate mold, the 2nd step of injecting melted metal into the socket plate mold with the internal bearing, the 3rd step of applying a pressing pressure to the mold thus solidifying the melted metal with the internal bearing into a socket plate and the 4th step of knocking out the solidified socket plate thus producing a resulting socket plate.

The above Korean method simplifies the process of producing the socket plates, thus effectively conserving time and improving productivity. However, the above method is problematic in that the internal bearing and the socket plate, which are formed from two metals having different mechanical and physical properties, are integrated into a single body through a casting process, so that the internal bearing may be loosened inside the hole of the socket plate.

SUMMARY OF THE INVENTION

It is, therefore, an object of the present invention to provide a method of producing a socket plate for wobble plate compressors in which the above problems can be overcome and which effectively prevents the insert ring from being unexpectedly loosened or removed from the socket plate.

It is another object of the present invention to provide a method of producing a socket plate for wobble plate compressors which integrates the insert ring and the socket plate, having different mechanical and physical properties, into a single body through a hot-forging process, thus simplifying the process of producing the socket plate and producing the socket plates on a large scale.

It is a further object of the present invention to provide a method of producing a socket plate for wobble plate compressors which forms a plurality of lubrication grooves on the internal surface of the insert ring during the hot-forging process, thus being free from an additional process of forming such lubrication grooves.

In order to accomplish the above object, the present invention provides a method of producing a socket plate for wobble plate compressors, comprising the steps of forming an insert ring and a holed socket plate parent metal, having different mechanical and physical properties, through extrusion processes, and hot-forging the socket plate parent metal with the insert ring being inserted into the holed parent metal, thus forming a resulting socket plate.

In the hot-forging step, the insert ring is seated onto a ring seat of a bottom mold prior to fitting the socket plate parent metal over the insert ring, with a hole of the parent metal being inserted over the insert ring. Thereafter, a top mold is lowered under pressure onto the bottom mold, thus forming the resulting socket plate.

In addition, a plurality of lubrication grooves are formed on the internal surface of the insert ring during the hot-forging step, with a plurality of projections being formed on the external surface of the insert ring at positions corresponding to the lubrication grooves. The projections bite into the inside wall of the holed parent metal thus integrating the ring with the parent metal into a single body.

BRIEF DESCRIPTION OF THE DRAWINGS

The above and other objects, features and other advantages of the present invention will be more clearly understood from the following detailed description taken in conjunction with the accompanying drawings, in which:

FIGS. 1a to 1f are views showing the process of producing a socket plate for wobble plate compressors according to the preferred embodiment of the present invention, in which:

FIG. 1a shows the 1st step of forming an insert ring through an extrusion process;

FIG. 1b shows the 2nd step of forming a socket plate parent metal through an extrusion process;

FIG. 1c is a sectional view showing a forging mold set used for hot-forging the socket plate;

FIG. 1d is a sectional view showing both the insert ring and the socket plate parent metal seated in the bottom mold of the forging mold set in the 3rd step;

FIG. 1e is a sectional view showing the top mold of the forging mold set which is lowered onto the bottom mold, with both the insert ring and the socket plate parent metal being seated in the bottom mold; and FIG. 1f is a sectional view showing the pressurized forging mold set in the 3rd step, with both the insert ring and the socket plate parent metal seated in the bottom mold;

DESCRIPTION OF THE PREFERRED EMBODIMENTS

FIGS. 1a to 1f are views showing the process of producing a socket plate for wobble plate compressors according to the preferred embodiment of this invention.

Figure 1A:
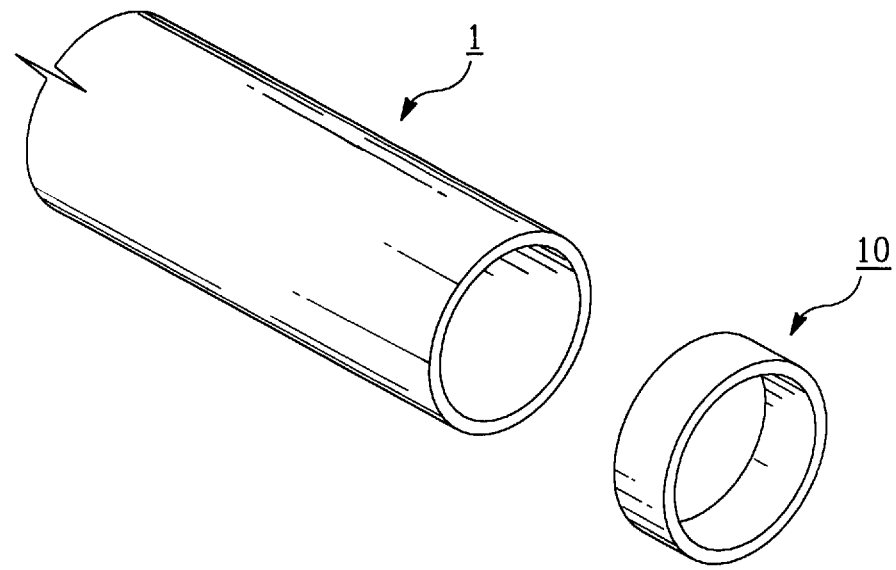

FIG. 1a shows the 1st step of forming an insert ring. In this 1st step, a longitudinal hollow pipe 1 having a predetermined diameter is formed through the extrusion process and is cut into a plurality of insert rings 10 using a cutter (not shown). Each of the rings 10 is to be inserted into the hole of a socket plate as will be described later herein.

The insert ring 10 preferably has an outer diameter smaller than the inner diameter of the hole of the socket plate so that the ring 10 is easily inserted into the hole.

Figure 1B:
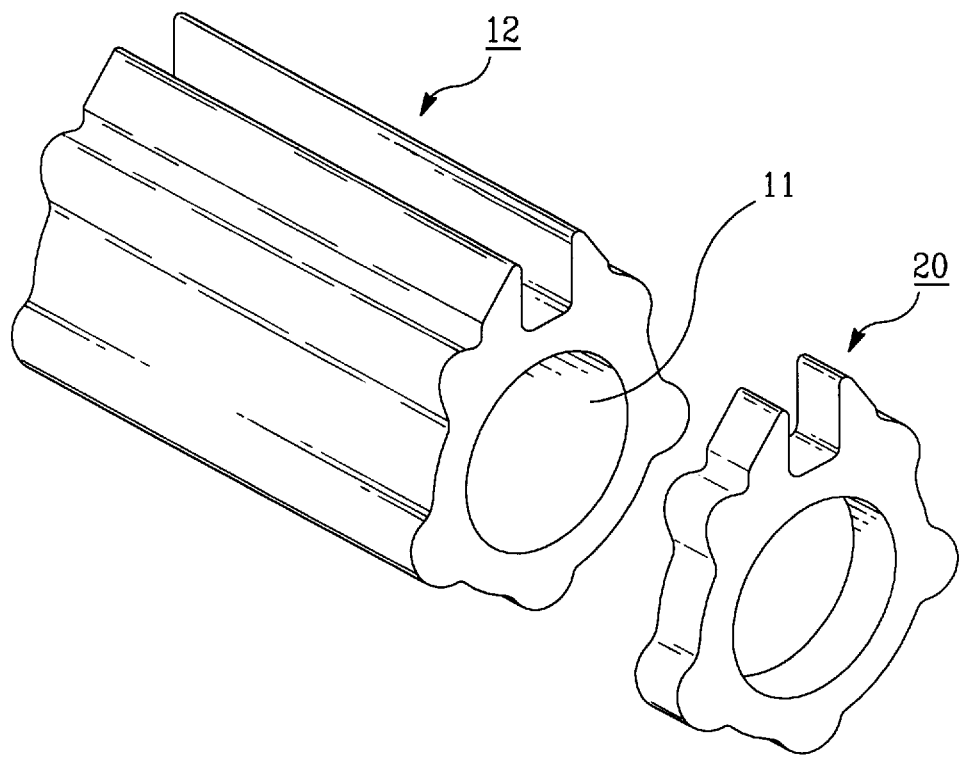

FIG. 1b shows the 2nd step of forming a socket plate parent metal through an extrusion process. In this step, an aluminum alloy is primarily formed into a longitudinal plate bar 12, having a predetermined configuration, using an extrusion forming machine. The plate bar 12, which has a central opening 11, in turn is cut into a plurality of socket plate parent metals 20 using a cutter (not shown).

Figure 1C:
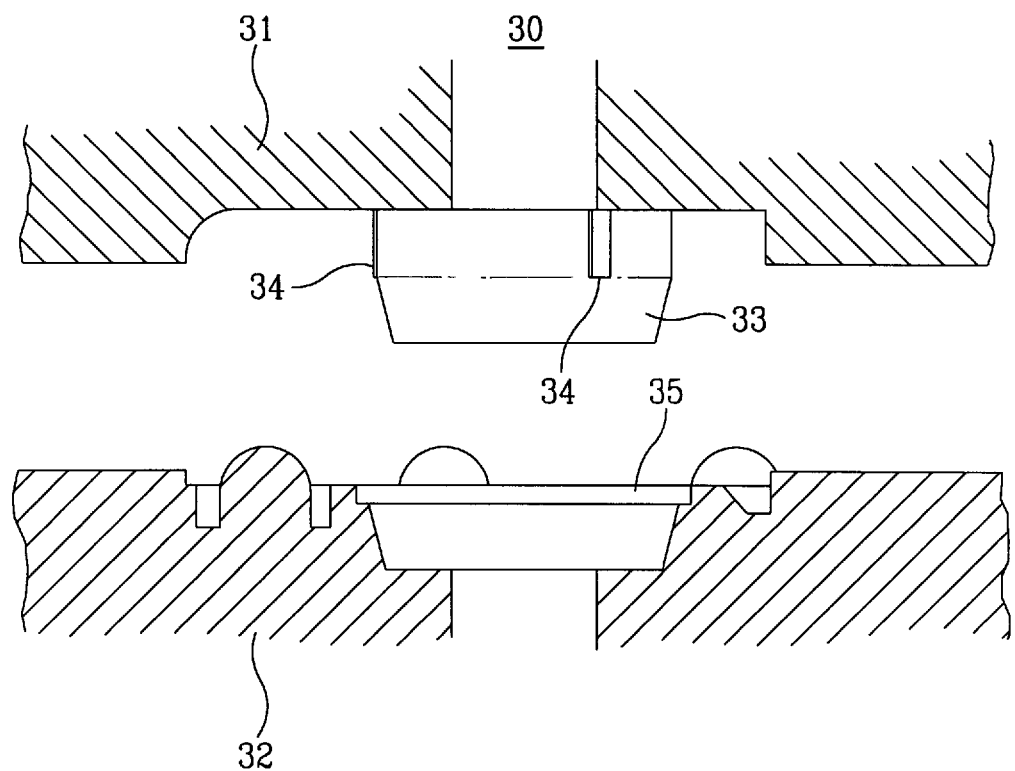

FIG. 1c is a sectional view showing a mold set 30 used for hot-forging the socket plate of this invention. The mold set 30 comprises two molds: top and bottom molds 31 and 32.

The top mold 31 is operated under pressure by a press and has a pressing body 33 on the inside center, with a plurality of vertical protrusions 34 being provided on the external surface of the pressing body 33. The above protrusions 34 form a plurality of lubrication grooves 2 on the internal surface of the insert ring 10 during the hot-forging process so that the method of this invention is free from an additional process of forming such lubrication grooves 2.

Meanwhile, the center of the bottom mold 32 has a ring seat 35, onto which the insert ring 10 is seated prior to the hot-forging process.

The molding surface of the top mold 31 is machined into a configuration corresponding to the shape of the bottom surface of a resulting socket plate 104, while the molding surface of the bottom mold 32 is machined into a configuration corresponding to the shape of the top surface of the socket plate 104.

Figure 1D:
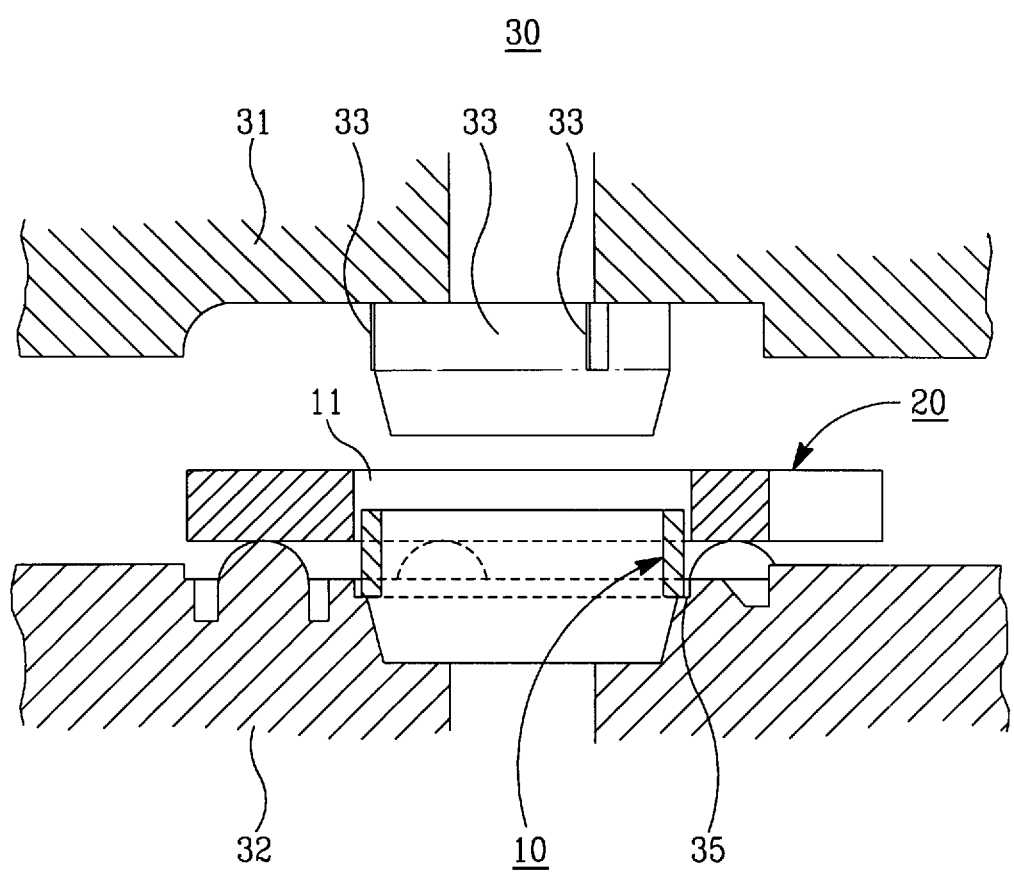
Figure 1E:
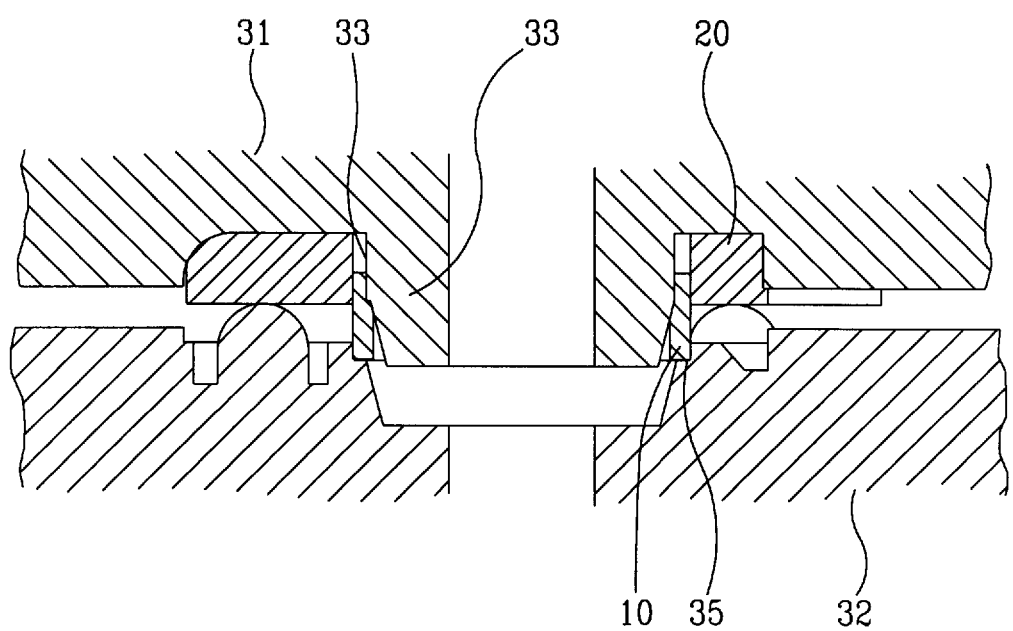
Figure 1F:
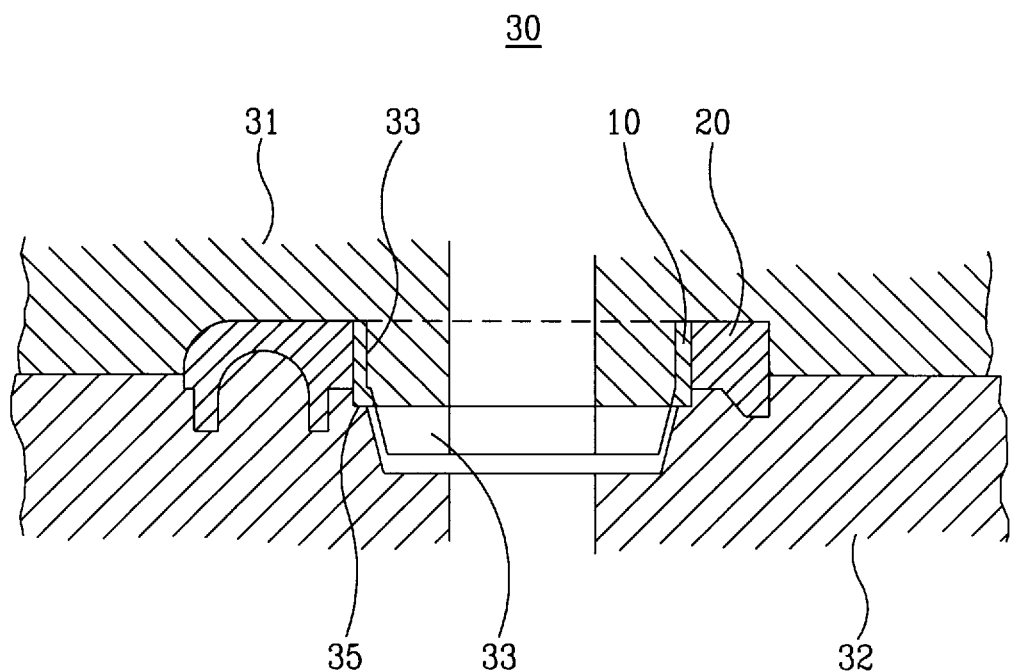

FIGS. 1d to 1f show the 3rd step of forming a socket plate using the above mold set. In the 3rd step, the insert ring 10 from the 1st step is seated onto the ring seat 35 of the bottom mold 32. In addition, the socket plate parent metal 20 from the 2nd step is fitted over the ring 10, with the hole 11 of the parent metal 20 being inserted over the ring 10 as shown in FIG. 1d.

Thereafter, a press pressure is applied to the top mold 31 so that the pressing body 33 of the top mold 31 is inserted into the ring 10, which is seated on the ring seat 35 of the bottom mold 32, under pressure as shown in FIG. 1e. During the pressing process, a plurality of lubrication grooves 2 are formed on the internal surface of the ring 10 by the protrusions 34 of the pressing body 33. The volume of the ring 10 in the above state does not vary so that the external surface of the ring 10 partially protrudes at positions corresponding to the grooves 2, thus forming a plurality of projections.

On the other hand, the socket plate parent metal 20 is formed into the predetermined configuration of a resulting socket plate by the top and bottom molds 31 and 32. The insert ring 10 in the above state is integrated with the parent metal 20 inside the hole 11 thereby forming a resulting socket plate 104 as shown in FIG. 1f. Thereafter, the press pressure is removed from the top mold 31 prior to returning the top mold 31 to its original position shown in FIG. 1d. The resulting socket plate 104 with the insert ring 10 is, thereafter, removed from the bottom mold 32.

During the 3rd step which is a hot-forging step, it is preferable to heat the mold set 30 to a temperature ranging from 200° C. to 450° C. At such a heating temperature, workability of the socket plate parent metal 20 with the insert ring 10 is remarkably increased, allowing the socket plates 104 to be produced on a large scale and improving productivity. The above heating temperature is also profitable to increase the metallographical density of the resulting socket plate 104.

Figure 2:
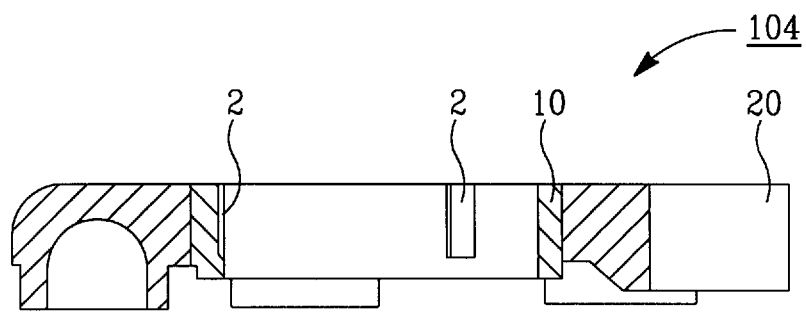
FIG. 2 is a sectional view of a socket plate produced by the method of this invention.
Figure 3:
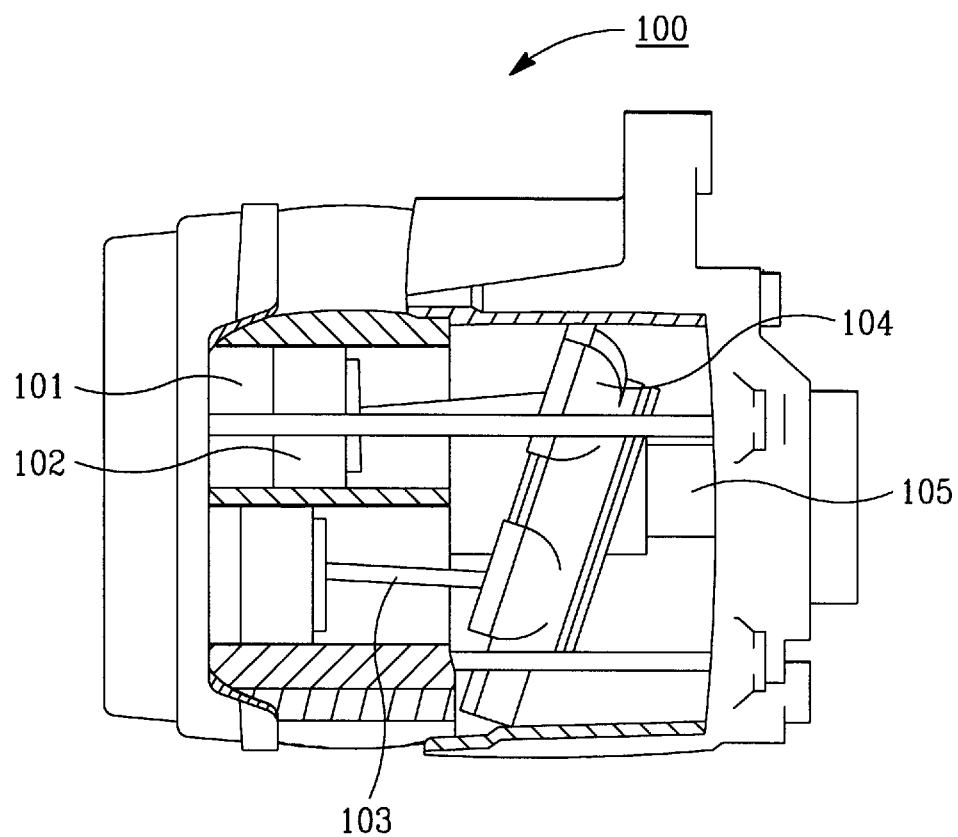
FIG. 3 is a sectional view of a wobble plate compressor with a socket plate.

FIG. 2 is a sectional view of the resulting socket plate 104 produced by the method of this invention. As shown in the drawing, the insert ring 10 is tightly set in the hole 11 of the socket plate 104, with the projections of the ring 10 biting into the side wall of the hole 11. Therefore, the insert ring 10 is almost completely free from being unexpectedly loosened or removed from the socket plate 104.

As described above, the present invention provides a method of producing a socket plate for wobble plate compressors. The method of this invention integrates the insert ring and the socket plate, having different mechanical and physical properties, into a single body through a hot-forging process, thus effectively preventing the insert ring from being unexpectedly loosened or removed from the socket plate. In the above method, a plurality of lubrication grooves are formed on the internal surface of the insert ring during the hot-forging process so that the method is free from an additional process of forming such lubrication grooves. This invention thus simplifies the process of producing the socket plate and producing the socket plates on a large scale.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of producing a socket plate for wobble plate compressors, comprising the steps of:

forming an insert ring and a holed socket plate parent metal, having different mechanical and physical properties, through extrusion processes; and hot-forging said socket plate parent metal with the insert ring being inserted into the holed parent metal, thus forming a resulting socket plate.

2. The method according to claim 1, wherein the hot-forging step comprises the steps of:

seating said insert ring onto a ring seat of a bottom mold;

fitting said socket plate parent metal over the insert ring, with a hole of the parent metal being inserted over said insert ring; and lowering a top mold under pressure onto said bottom mold, thus forming the resulting socket plate.

3. The method according to claim 1, wherein a plurality of lubrication grooves are formed on the internal surface of said insert ring during the hot-forging step, with a plurality of projections being formed on the external surface of said insert ring at positions corresponding to said lubrication grooves, said projections biting into the inside wall of said holed parent metal thus integrating the ring with the parent metal into a single body.

* * * * *